C. E. COCHRAN.
SPRING STEERING FORK FOR WHEELED VEHICLES.
APPLICATION FILED FEB. 27, 1919.
1,422,671.
Patented July 11, 1922.
3 SHEETS—SHEET 1.
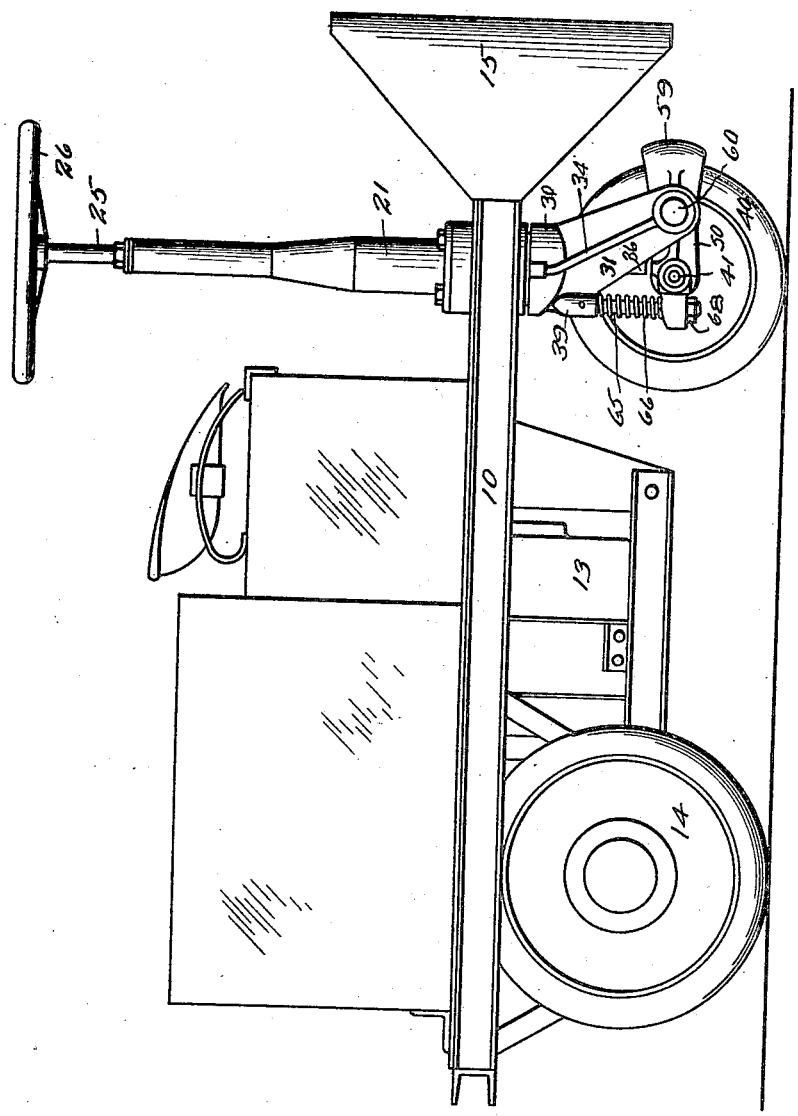

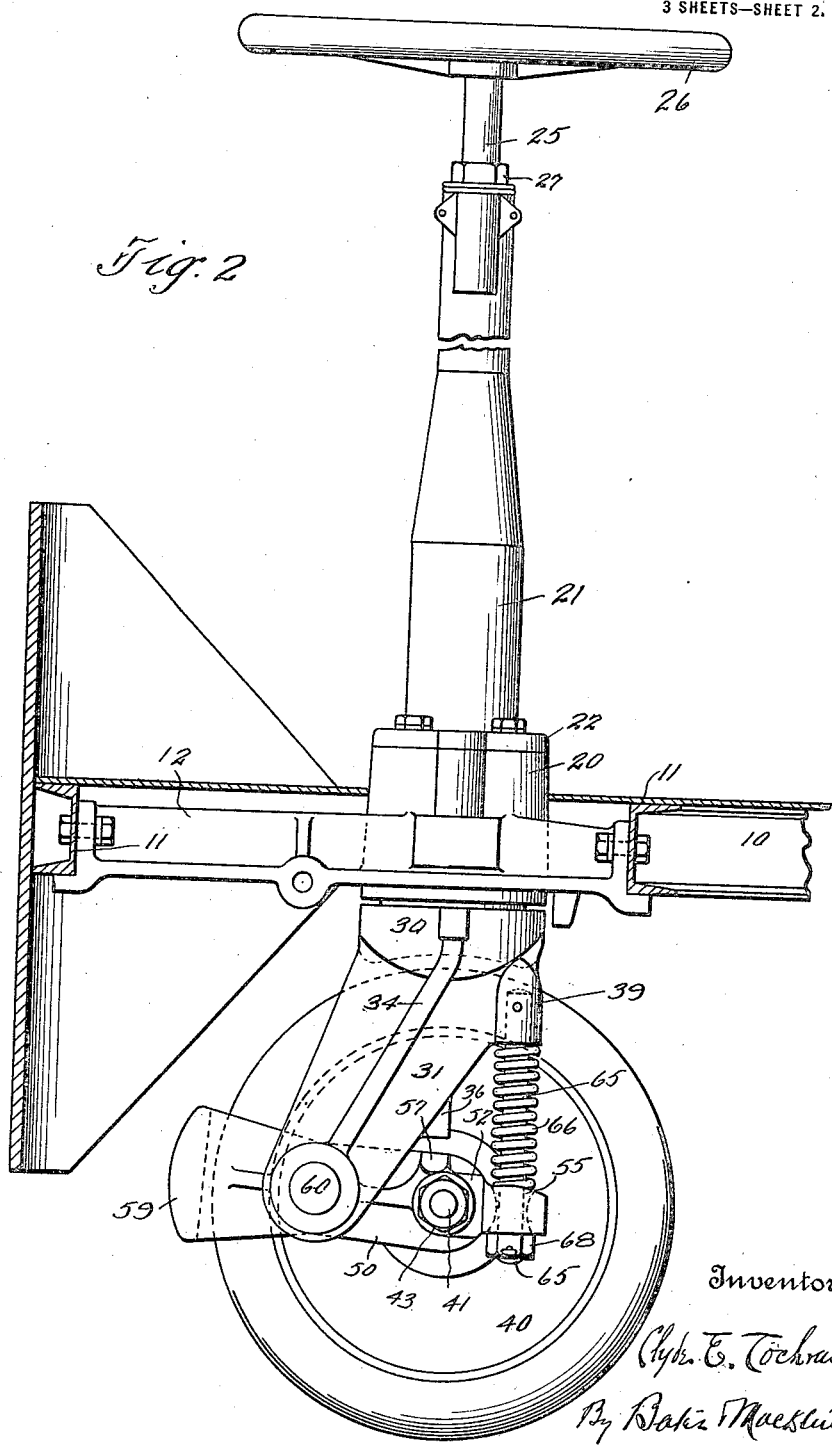

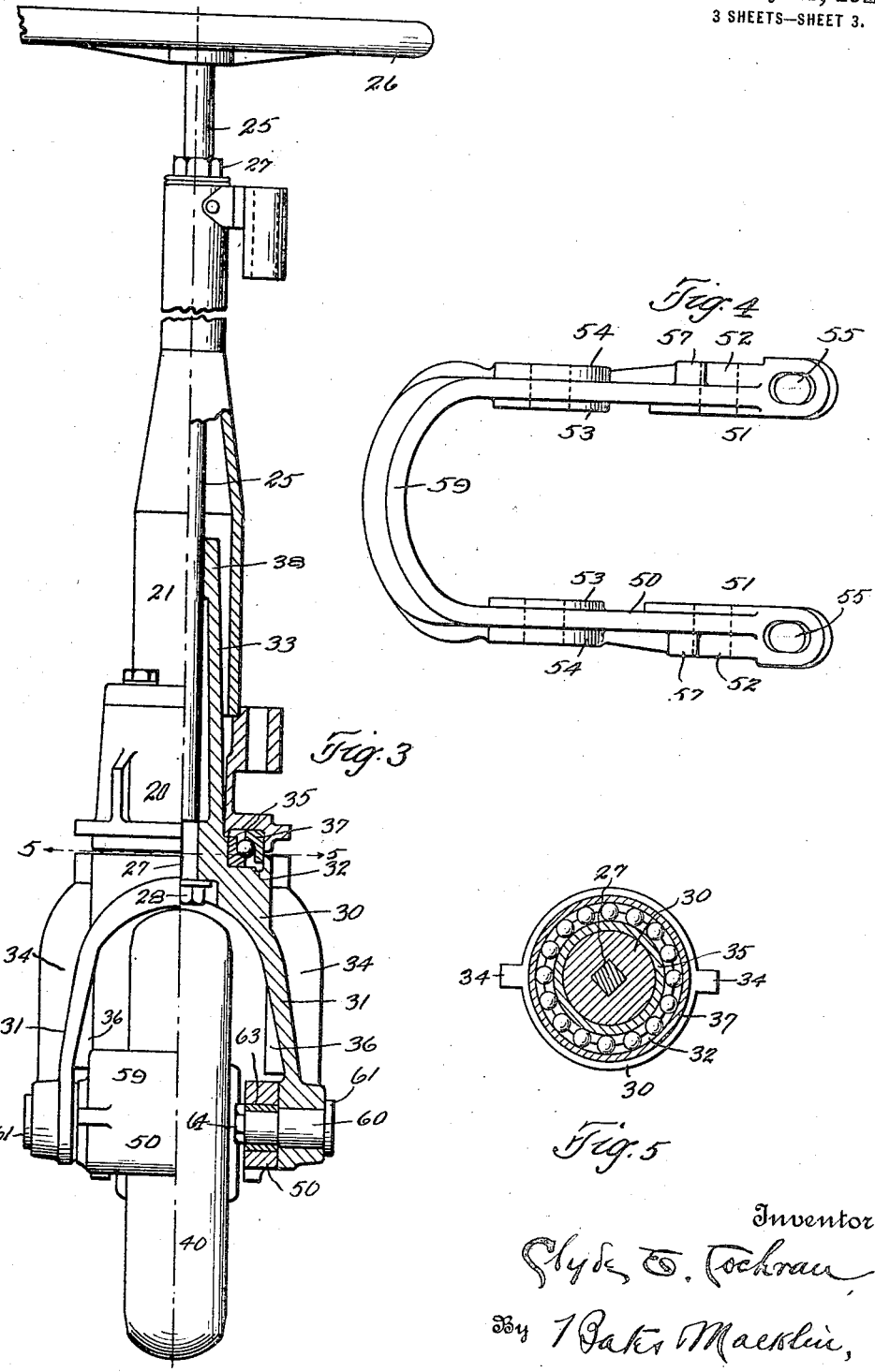

UNITED STATES PATENT OFFICE.

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

SPRING STEERING FORK FOR WHEELED VEHICLES.

1,422,671.     Specification of Letters Patent.     Patented July 11, 1922.

Application filed February 27, 1919. Serial No. 279,516.

*To all whom it may concern:*

Be it known that I, CLYDE E. COCHRAN, a citizen of the United States, residing at Cleveland, in the county of Cuyahoga and State of Ohio, have invented a certain new and useful Improvement in Spring Steering Forks for Wheeled Vehicles, of which the following is a full, clear, and exact description, reference being had to the accompanying drawings.

The object of this invention is to provide an efficient spring fork for three-wheeled tractors and similar machines where there is a steering wheel supporting a considerable load. My fork provides the desired elastic support for the load and also a firm and effective holding of the wheel so that it may be readily turned to steer the vehicles. The invention is illustrated in the drawings hereof, and is hereinafter more fully explained and its essential characteristic summarized in the claims.

In the drawings, Fig. 1 is a side elevation of a three-wheeled tractor provided with my spring steering fork; Fig. 2 is a side elevation of the fork and its carrying frame on a larger scale, the adjacent portion of the tractor frame being sectioned; Fig. 3 is a sectional front elevation of the steering structure; Fig. 4 is a plan of the yoke which forms the connection between the fork proper and the wheel; Fig. 5 is a horizontal section through the ball bearing between the fork and its guiding housing, as indicated by the line 5—5 on Fig. 3.

The frame of the tractor shown in Figs. 1 and 2 includes longitudinal beams 10, cross beams 11, and a casting 12, between the cross beams. This frame is shown as carrying a suitably suspended driving motor 13 connected by means, not shown, to the rear wheels 14. At the front, the frame carries a suitable shield 15, and may support a floor 16. The parts mentioned are shown somewhat diagrammatically and conventionally and may be of any approved form and construction.

The frame casting 12 supports an upright housing for journalling the fork and its connected steering post. As shown, this housing consists of a stationary collar 20 secured to, or forming a part of, the casting 12, and a tubular extension 21 having at its lower end a radial flange 22 bolted to the top of the collar. The steering post is designated 25; it carries at its upper end suitable means for turning it, as the hand wheel 26. This post is guided in the upper end of the housing by a suitable annular bearing adjusted by the nut 27.

The fork proper of this invention is a bifurcated rotative member having two depending arms 31 forwardly inclined and connected at their upper ends by a circular head 30 from which rises a tubular extension 33 within the stationary housing. The fork arms are preferably provided with ribs 34 on their outer faces for stiffness. In the upper face of the head 30 is an annular recess 32 in which seats a ring 35 forming the inner member of a ball race-way. A corresponding annular recess is formed in the lower face of the stationary housing 20 and in this recess seats the ring 37 forming the outer member of the ball race-way.

The steering post 25 is snugly embraced at 38 by the tubular socket of the fork 33. At its lower end this post is reduced as shown at 27 and made angular to occupy a corresponding hole in the forked head, and receives a nut 28 in its lower end. By this means the steering post is clamped rigidly to the fork head, is intermediately guided, and turns freely in the bearing at the upper end of the housing 21. The ball bearing transmits the weight to the fork and allows it to be very readily turned.

The steering wheel 40 is of any approved form and construction and is mounted to rotate on a stationary axle 41. This axle extends through and is rigidly clamped to an approximately horizontal yoke 50. Nuts 43 on the end of the axle secure it rigidly to the yoke. This yoke is a stiff member, formed substantially U-shape, as shown in Fig. 4, and extends from the axle along the inner sides of the lower portions of the fork arms 31 and intermediately at 59, across the periphery of the wheel. The yoke is preferably ribbed for stiffness and strength, and has suitable bosses 51 and 52 on its inner and outer sides where the wheel axle extends through it; it also has bosses 53 and 54 where it crosses the fork, and at these points it is pivoted to the fork by pins 60, which extend through the fork and yoke.

These pins are shown as having heads 61 on their outer sides and inside of the fork having reduced portions which are surrounded by bearing bushings 63 and beyond this have nuts 64. This provides for effectively pivoting the yoke to each of the two arms of the fork.

Above the rear free ends of the yoke the fork head is provided with a pair of sockets 39. These sockets are occupied by vertical pins 65 which extend downwardly through holes 55 formed in the end portions of the yoke. Helical compression springs 66 surround these pins between the yoke and the sockets 39. Nuts 68 screwing onto the lower ends of the pins limit the downward movement. The holes 55 through the yoke are loose about the pins as illustrated in Figs. 2 and 4 or the pins may be secured loosely in the sockets to allow the yoke to readily swing up and down without binding on the pins.

When the structure is in use the springs 66 are compressed to a variable extent and the ends of the yoke arms occupy a position about the pins above that shown in Fig. 2. Suitable lugs 57 projecting from the sides of the yoke are adapted to abut the lower edge of inward projections 36 of the fork arms 31 and form a positive stop for the upward movement of the yoke arms.

The yoke by reason of the rigid connection of its two side arms (that is by the arched brace 59) provides a pair of stiff cantilevers projecting rearwardly from the load pivots 60. These cantilever arms readily carry the wheel axle and brace it with sufficient firmness to effect its proper steering without the necessity of guides at the other edge of the wheel, which have heretofore been employed. My cantilever construction simplifies the structure and renders it more compact, and effectively holds the wheel. This is of great importance when the wheel is turned and its progress thus resisted and the forward momentum of the vehicle tends to skew the members carrying the wheel.

The stiffness of the U-shaped yoke prevents any lateral strain being thrown on the pins 65, which are used to position the springs, and also as tension members for limiting the downward movement of the yoke under the spring pressure, but have no effect as lateral guides for the ends of the yoke, no such guides being needed. The whole construction is simple and compact, provides the desirable elastic support, and still allows the wheel to be held and steered as firmly as with a solid fork.

Having thus described my invention what I claim is:—

1. The combination of a fork member, a pair of arms pivoted thereto, a wheel between said arms and mounted thereon, there being extensions of the arms beyond the wheel axis, pins extending downwardly from the fork member and rigidly secured thereto, and compression springs surrounding the pins and bearing against said extensions.

2. The combination of a bifurcated member, means for guiding and turning it, a yoke having a pair of arms and a connecting portion, a wheel mounted on an intermediate portion of the yoke between the arms thereof, said yoke arms being pivoted to the bifurcated member on one side of the wheel axis, there being extensions of the yoke on the other side of the wheel axis, pins extending downwardly from the bifurcated member and rigidly carried thereby, and passing freely through the extensions of the yoke and having stops on their lower ends.

3. In a device of the class described, the combination of a fork member comprising a head, said head being rotatively mounted and carrying two depending arms, the arms inclining in the same direction from the head, a yoke having arms pivoted to the lower ends of the fork arms, a wheel mounted between the yoke arms and carried thereby, pins rigid with the head and slidably mounted in said yoke arms, and springs embracing said pins and extending between the ends of the yoke arms and the head, said pins being provided with a member for limiting the downward movement of the yoke.

4. The combination of a rotative head having depending arms and downwardly facing sockets, a U-shaped yoke horizontally pivoted to the lower ends of the arms extending beneath the sockets, pins in the sockets projecting downwardly and extending freely through the yoke arms, nuts on the lower ends of the pins, compression springs surrounding the pins between the sockets and yoke arms, and a wheel between the yoke arms secured to them on an axis between the pivoting of the yoke to the fork and the engagement of the yoke with the pins.

5. A device of the class described comprising a fork member having a steering stem whereby it is rotatably mounted, a yoke having its two arms pivoted to the arms of said member respectively, a wheel rotatably mounted between the two arms, an enlarged shoulder portion on said bifurcated member at the point where the fork arms connect with the stem and a longitudinal upstanding rib of substantial width extending from said shoulder longitudinally of said arms, and stops carried by said arms for limiting the upward motion of the wheel.

6. A device of the character described comprising a fork member having a steering stem whereby it is rotatably mounted, the arms of the fork being inclined from the stem and flared outwardly, a yoke having its arms pivoted to the arms of said member, a wheel rotatably mounted in said yoke arms, stops carried by the arms of said first named member and aligned with said rotative stem, and adapted to contact with said yoke arms to limit the upward movement of the wheel without exerting bending strain on the fork arms.

7. The combination of a bifurcated member having a rotatably mounted stem, means for guiding and turning it, a yoke having a pair of arms and a connecting portion, a wheel mounted on an intermediate portion of the yoke between the arms thereof, said yoke arms being pivoted to the bifurcated member on one side of the wheel axis there being extensions of the yoke arms on the other side of the wheel axis, a pair of pins extending downwardly from the bifurcated member, and lugs on the yoke adapted to contact with said pins to limit the upward movement of the yoke and compression springs surrounding the pins and bearing against the yoke extensions.

8. In a device of the character described, the combination of a fork member comprising a rotative head and two depending arms, the arms inclining in the same direction from the head, a U-shaped yoke pivoted to the lower ends of the fork arms and having its arms extending toward the plane through the axis of rotation of the fork, a wheel having its axis substantially in such plane and mounted in the yoke arms, the yoke arms having extensions beyond the wheel axis, springs between such extensions and the upper portion of the fork arms, and downwardly faced lugs integral with the arms of the fork and means on said yoke member adapted to contact with said lugs.

In testimony whereof, I hereunto affix my signature.

CLYDE E. COCHRAN.